(12) United States Patent
Matsui et al.

(10) Patent No.: US 7,034,970 B2
(45) Date of Patent: Apr. 25, 2006

(54) OPTICAL RECORDING MEDIUM AND METHOD FOR PRODUCING SUCH AN OPTICAL RECORDING MEDIUM

(75) Inventors: Norie Matsui, Ashigarakami-gun (JP); Katsunori Kawano, Ashigarakami-gun (JP); Jiro Minabe, Ashigarakami-gun (JP); Tatsuya Maruyama, Ashigarakami-gun (JP); Shin Yasuda, Ashigarakami-gun (JP); Kazuhiro Hama, Ebina (JP); Tsutomu Ishii, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 115 days.

(21) Appl. No.: 10/657,147

(22) Filed: Sep. 9, 2003

(65) Prior Publication Data

US 2004/0190093 A1 Sep. 30, 2004

(30) Foreign Application Priority Data

Mar. 24, 2003 (JP) .............................. 2003-081289

(51) Int. Cl.
*G03H 1/04* (2006.01)
(52) U.S. Cl. .............................. 359/3; 359/1; 359/900; 430/1

(58) Field of Classification Search .................. 359/1, 359/3, 7, 900; 430/1, 2, 3
See application file for complete search history.

(56) References Cited

U.S. PATENT DOCUMENTS

| 5,162,927 A | * | 11/1992 | Moss et al. ..................... 359/3 |
| 5,282,066 A | * | 1/1994 | Yu et al. ......................... 359/3 |
| 6,322,932 B1 | * | 11/2001 | Colvin et al. .................. 430/2 |
| 2003/0156523 A1 | * | 8/2003 | Wu et al. ................... 369/103 |

FOREIGN PATENT DOCUMENTS

JP A 11-250496 9/1999

* cited by examiner

*Primary Examiner*—Fayez G. Assaf
(74) *Attorney, Agent, or Firm*—Oliff & Berridge, PLC.

(57) ABSTRACT

The present invention relates to a method for producing an optical recording medium. In the method, on the surface of a recording layer formed by spin-coating a first coating solution containing a photo-isomerizable component, a second coating solution that contains a photo-isomerizable component that can be isomerized by radiation having the same wavelength as radiation used for isomerizing the photo-isomerizable component contained in the recording layer and incapable of dissolving the recording layer is spin-coated to form an intermediate layer. Since the intermediate layer thus formed cannot be dissolved by the first coating solution, a recording layer is further laminated on this layer. Thus, it becomes possible to make the recording layer thicker and also to provide a high-density recording characteristic.

8 Claims, 2 Drawing Sheets

OPTICAL RECORDING MEDIUM AND METHOD FOR PRODUCING SUCH AN OPTICAL RECORDING MEDIUM

BACKGROUND OF THE INVENTION

CROSS-REFERENCE TO RELATED APPLICATION

This application claims priority under 35 USC 119 from Japanese patent Application No. 2003-081289, the disclosure of which is incorporated by reference herein.

1. Field of the Invention

The present invention relates to an optical recording medium and a method for producing the optical recording medium. More particularly, the invention relates to an optical recording medium provided with a plurality of recording layers on which information can be recorded holographically are laminated, and a method for producing the optical recording medium by spin-coating.

2. Description of the Related Art

Conventionally, rewritable optical disk recording media, such as 12 cm-diameter DVD-RAM capable of high-density, double-sided recording of 5.2 GByte (Gigabyte) with a phase change system, have already been widely used. However, in these optical disk recording media, since data are recorded in a plane, high-density recording is restricted by diffraction limit of radiation and has come close to a physical limitation. In order to achieve a higher recording capacity, a three-dimensional (volume) recording system including a depth direction is required. With respect to the above-mentioned volume-type recording medium, a volume holography memory capable of volume-recording hologram lattices has been regarded as a prospective medium.

Here, in order to achieve a large capacity in the volume holography memory, "a thicker recording layer" is the most important factor. In general, the thicker the hologram, the narrower the incident angle conditions for allowing diffraction, and only a slight offset from Bragg conditions causes diffraction radiation to disappear. The multiple angle method in the volume holography memory utilizes this angle selectivity. In other words, a plurality of holograms are formed in the same volume, and by controlling the incident angle of reading radiation, it becomes possible to read a desired hologram without crosstalk. In this manner, by increasing the film thickness of the recording layer so as to improve the angle selectivity, the multiplicity can be increased so that the recording capacity is increased.

In DVDs and the like, in general, the spin-coating has been used for forming a recording layer. In the spin-coating, a coating solution is dropped onto portions near center on a rotating disk, the coating solution, driven by centrifugal force, flows and reaches the periphery of the disk to form a film, excessive coating solution flies out from the periphery of the disk, then the solvent is removed from the film. For example, recording layers and non-recording layers are laminated alternately by using the spin-coating to form a multi-layer holographic memory (see Japanese Patent Application Laid-Open (JP-A) No. 11-250496). In this example, a solution A prepared by dissolving polymer containing a photo-reactive component in pyridine is spin-coated to form a recording layer having a thickness of 1 µm, and on this recording layer, a solution B prepared by dissolving polyvinyl alcohol in water is spin-coated to form a non-recording layer having a thickness of 8 µm.

However, it is very difficult to form a recording layer having a thickness of several tens µm or more to be used for the volume holography through single spin-coating process. Since the holography memory disclosed in JP-A No. 11-250496 is not used for multiplex recording, the thickness of the recording layer formed in the method disclosed in JP-A No. 11-250496 is as thin as approximately 1 µm. Further, since holograms recorded in the laminated recording medium are formed in the respective recording layers for avoiding crosstalks, this method is not suitable for the volume holography.

SUMMARY OF THE INVENTION

Considering the conventional problems, an object of the present invention is to provide a method for producing an optical recording medium, which can produce an optical recording medium provided with a thick recording layer by employing a spin-coating process. Another object of the invention is to provide an optical recording medium capable of forming volume holograms over the entire laminated thick film and a method for producing an optical recording medium which can produce such an optical medium.

A method for producing an optical recording medium of the invention for achieving the objects can be employed for producing an optical recording medium in which a plurality of recording layers on which information can be recorded holographically are laminated on a disc-shaped substrate with intermediate layers between the recording layers. The method is characterized by the steps of: applying a first coating solution containing a photo-isomerizable component onto a surface of the horizontally-held substrate or intermediate layer; the coating solution is driven toward and flied out from the periphery of the substrate by a centrifugal force generated by rotating the substrate while the film is dried, to form the recording layer; applying to the surface of the recording layer a second coating solution incapable of dissolving the recording layer and containing a photo-isomerizable component that can be isomerized by radiation having the same wavelength as radiation used for isomerizing a photo-isomerizable component contained in the recording layer; and the second coating solution is driven toward and flied out from the periphery of the substrate by a centrifugal force generated by rotating the substrate while the film is dried, so that an intermediate layer that cannot be dissolved by the first coating solution is formed.

In the method for producing the optical recording medium of the invention, on the surface of the recording layer formed by spin-coating the first coating solution containing a photo-isomerizable component, a second coating solution that does not dissolve the recording layer is spin-coated to form an intermediate layer. Since the intermediate layer thus formed is not dissolved by the first coating solution, a recording layer is further laminated on this layer. Thus, it is possible to make the recording layer thicker by using the intermediate layer.

Moreover, the intermediate layer contains a photo-isomerizable component that can be isomerized by radiation having the same wavelength as that used for isomerizing a photo-isomerizable component contained in the recording layer so that holograms can be recorded in both of the recording layers and the intermediate layers sandwiched between the recording layers. The photo-isomerizable component contained in the intermediate layer may be the same as or different from the photo-isomerizable component contained in the recording layer. The intermediate layer containing the photo-isomerizable component enables information to be recorded also in the intermediate layer to increase the recording capacity.

In the method for producing an optical recording medium, a plurality of recording layers and intermediate layers preferably contain photo-isomerizable components that can be photo-isomerized by radiation having the same wavelength. With such a constitution, recording and reproducing processes for information recorded on the respective recording layers and intermediate layers can be carried out by using a single radiation source, thereby making it possible to simplify the structure of the recording and reproducing systems at low costs. Consequently, it becomes possible to provide a wider window for optical precision.

Moreover, the thickness of the intermediate layer is preferably made thinner than that of the recording layer, and set to ¼ or less of the incident wavelength λ. By making the thickness of the intermediate layer thinner than the thickness of the recording layer, the recording layer is further made thicker. Moreover, with the intermediate layer having a thickness of ¼ or less of the incident wavelength λ, the incident radiation can pass through without reflection on the interface. Hence, recording and reproducing processes are not influenced by the reflection.

Furthermore, the viscosity of the first coating solution is preferably made higher than that of the second coating solution. By making the viscosity of the first coating solution higher, the recording layer can be further made thicker. The thickness of the film in which the recording layers and the intermediate layers are laminated is preferably 10 μm or more.

Here, the photo-isomerizable component may be a polymer component containing a photo-isomerizable organic atomic group or a polymer component in which photo-isomerizable organic molecules are dispersed. With respect to the photo-isomerizable organic atomic group or the photo-isomerizable organic molecules, azobenzene is particularly preferable.

Moreover, the optical recording medium of the invention for achieving the objects is an optical recording medium in which a plurality of recording layers on which information can be recorded holographically are laminated on a disc-shaped substrate. The optical recording medium is characterized in that the optical recording medium comprises alternate lamination of recording layers each containing a photo-isomerizable component that records holograms by photo-isomerization; and intermediate layers each of which contains a photo-isomerizable component that can be isomerized by radiation having the same wavelength as radiation used for isomerizing the photo-isomerizable component contained in the recording layer and is composed of a material that can be dissolved or dispersed in a solvent that does not dissolve the recording layer.

In the optical recording medium of the invention, the intermediate layer contains a photo-isomerizable component that can be isomerized by radiation having the same wavelength as radiation used for the photo-isomerizable component contained in the recording layer; therefore, holograms can be recorded in both of the recording layers and the intermediate layer sandwiched between the recording layers. In other words, the intermediate layer functions virtually as a recording layer. For example, the recording layers and the intermediate layers can be laminated alternately by forming the recording layer out of a water-insoluble material and forming the intermediate layer out of a material that can be dissolved or dispersed in water.

DETAILED DESCRIPTION OF THE INVENTION

Figure 1:
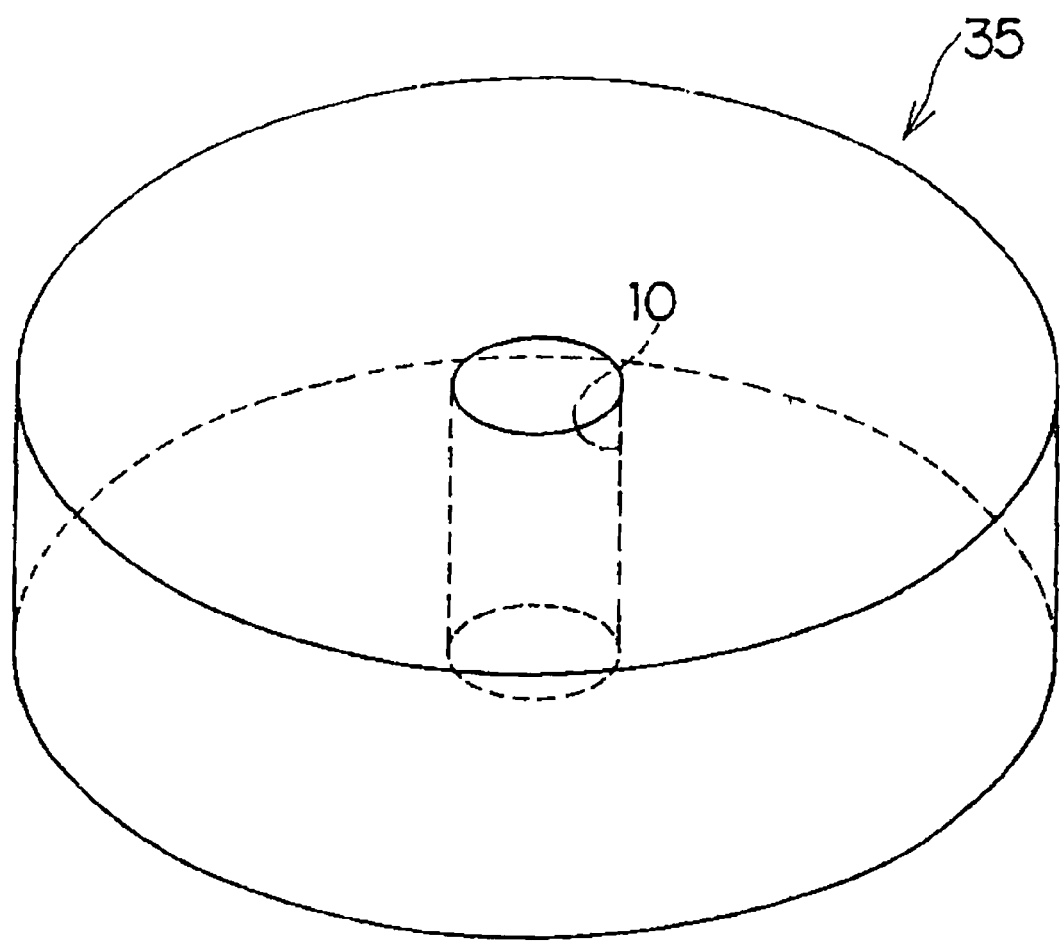
FIG. 1 is a perspective view that shows the external appearance of an optical recording medium according to the present invention.

The following description will discuss embodiments of a method for producing an optical recording medium of the present invention.

An embodiment of the invention is a method (U) for producing an optical recording medium comprising a plurality of recording layers on a disc-shaped substrate on which information can be recorded holographically, and intermediate layers provided between the recording layers, the method comprising:

applying a first coating solution containing a photo-isomerizable component, which records information holographically by photo-isomerization onto a surface of one of the substrate or the intermediate layer, which is being held horizontally;

allowing the coating solution to flow toward a periphery of the substrate by a centrifugal force generated by rotating the substrate while a film is dried, to provide the recording layer;

applying a second coating solution containing a photo-isomerizable component that can be isomerized by radiation having the same wavelength as radiation used for isomerizing a photo-isomerizable component contained in the recording layer and incapable of dissolving the recording layer, to a surface of the recording layer; and allowing the second coating solution to flow toward the periphery of the substrate by a centrifugal force generated by rotating the substrate while a film is dried, to provide an intermediate layer that cannot be dissolved by the first coating solution.

Another embodiment of the invention is the method (U) for producing an optical recording medium, wherein each of the recording layers contain photo-isomerizable components that can be isomerized by radiation having a same wavelength.

Another embodiment of the invention is the method (U) for producing an optical recording medium, wherein a thickness of the intermediate layer is thinner than a thickness of the recording layer.

Another embodiment of the invention is the method (U) for producing an optical recording medium, wherein a thickness of the intermediate layer is no more than ¼ of an incident wavelength λ.

Another embodiment of the invention is the method (U) for producing an optical recording medium, wherein a viscosity of the first coating solution is higher than a viscosity of the second coating solution.

Another embodiment of the invention is the method (U) for producing an optical recording medium, wherein the photo-isomerizable component is a polymer component containing a photo-isomerizable organic atomic group or a polymer component in which photo-isomerizable organic molecules are dispersed.

Another embodiment of the invention is the method (U) for producing an optical recording medium, wherein the photo-isomerizable component is a polymer component containing a photo-isomerizable organic atomic group or a polymer component in which photo-isomerizable organic molecules are dispersed, and the photo-isomerizable organic atomic group or the photo-isomerizable organic molecules are azobenzene.

Another embodiment of the invention is the method (U) for producing an optical recording medium, wherein a laminated film constituted by the recording layers and the intermediate layers has a thickness of at least 10 µm.

Another embodiment of the invention is an optical recording medium (V) comprising a plurality of recording layers on which information can be recorded holographically on a disc-shaped substrate, wherein the recording layers each contain photo-isomerizable components that record holograms through photo-isomerization, and intermediate layers, each of which contains photo-isomerizable components that can be isomerized by radiation having a same wavelength as radiation used for isomerizing the photo-isomerizable component contained in the recording layer and is composed of a material that can be one of dissolved or dispersed in a solvent that does not dissolve the recording layer, are laminated alternately in the optical recording medium.

Another embodiment of the invention is the optical recording medium (V), wherein the recording layer is composed of a water-insoluble material and the intermediate layer is composed of a material that cannot be dissolved in water.

Another embodiment of the invention is the optical recording medium (V), wherein the recording layers contain photo-isomerizable components that can be isomerized by radiation having the same wavelength.

Another embodiment of the invention is the optical recording medium (V), wherein a thickness of the intermediate layer is thinner than the thickness of the recording layer.

Another embodiment of the invention is the optical recording medium (V), wherein a thickness of the intermediate layer is no more than ¼ of an incident wavelength $\lambda$.

Another embodiment of the invention is the optical recording medium (V), wherein the photo-isomerizable component is a polymer component containing a photo-isomerizable organic atomic group or a polymer component in which photo-isomerizable organic molecules are dispersed.

Another embodiment of the invention is the optical recording medium (V), wherein the photo-isomerizable component is a polymer component containing a photo-isomerizable organic atomic group or a polymer component in which photo-isomerizable organic molecules are dispersed, and the photo-isomerizable organic atomic group or the photo-isomerizable organic molecules are azobenzene.

Still another embodiment of the invention is the optical recording medium (V), wherein a laminated film constituted by the recording layers and the intermediate layers has a thickness of at least 10 µm.

[Optical Recording Medium]

First, the structure of an optical recording medium obtained by the production method of the invention is explained.

Figure 2:
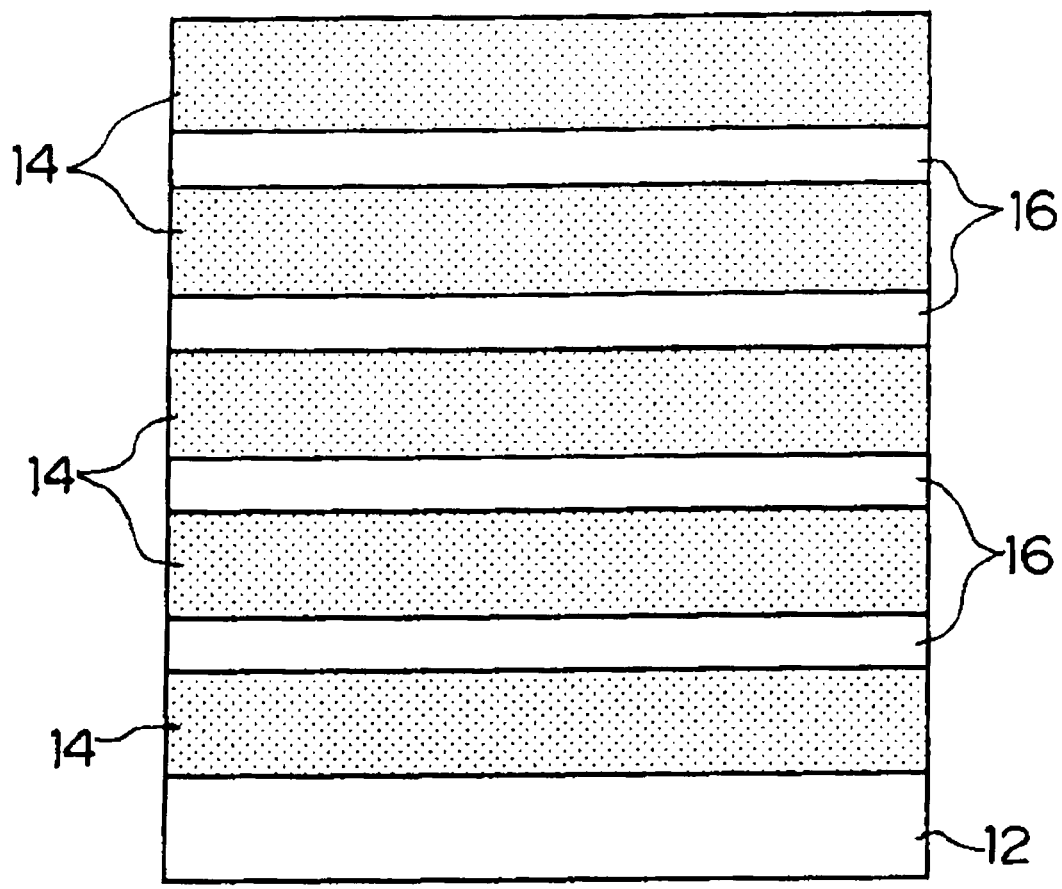
FIG. 2 is a cross-sectional view that shows one example of a layer structure of an optical recording medium according to the invention.

As shown in FIG. 1, an optical recording medium 35 is a disc-shaped recording medium having a center hole 10 formed in the center. As shown in FIG. 2, the optical recording medium 35 is constituted by a plurality of recording layers 14 and a plurality of intermediate layers 16 that are laminated alternately on a disc-shaped transparent substrate 12. FIG. 2 shows an example in which five recording layers 14 and four intermediate layers 16 are provided, however, the number of the laminated layers is not limited to this example.

With respect to the transparent substrate 12, a substrate, such as a quartz substrate, a glass substrate and a plastic substrate, can be used. Here, "transparent" refers to the fact that the substrate is transparent with respect to recording radiation and reproducing radiation. With respect to the material for the plastic substrate, examples thereof include polycarbonate; acrylic resins such as polymethyl methacrylate; vinylchloride-based resins such as polyvinylchloride and a vinylchloride copolymer; epoxy resins; amorphous polyolefin and polyester; all of which are made to have a low index of double refraction. From the viewpoint of moisture resistance, dimensional stability and price, polycarbonate is particularly preferable. The thickness of the transparent substrate 12 is preferably from 0.01 to 5 mm. Here, the transparent substrate 12 may be provided with a concave and convex pattern (pregrooves) that represents guide grooves for use in tracking or information such as address signals.

Holograms can be recorded in the recording layers 14 and the intermediate layers 16 by changing the refractive indexes or absorption coefficients of the recording layers 14 and the intermediate layers 16 through photo-isomerization. The recording layers 14 or the intermediate layers 16 may be composed of any material as long as it maintains the changed refractive indexes or absorption coefficients at normal temperature. Examples of the preferable material include photo-responsive materials that exhibit photo-induced double refraction. Those materials that exhibit photo-induced double refraction respond to a polarizing state of incident radiation, and can record the polarizing direction of the incident radiation. Here, the optical recording medium in which photo-induced double refraction holograms corresponding to the polarization distribution can be recorded is referred to as an optical recording medium sensitive to polarization.

As material that exhibits photo-induced double refraction, a polymer or a polymer crystal having a photo-isomerizable group on its side chain, or a polymer in which photo-isomerizable molecules are dispersed, is preferably used. With respect to the photo-isomerizable group or molecules, for example, those materials having an azobenzene skeleton are preferably used.

The following description will discuss the principle of photo-induced double refraction, using azobenzene as an example. As shown in the following chemical formulae, azobenzene is allowed to exhibit a trans-cis photo-isomerizing property when irradiated with radiation. Prior to the irradiation of a photorecording layer with radiation, many trans-state azobenzene molecules exist in the photorecording layer. These molecules are randomly oriented, and are isotropic from a macroscopic viewpoint. When linearly polarizing radiation is irradiated to the photorecording layer in a predetermined direction indicated by an arrow, a trans1-state molecule having an absorption axis in the same orientation as the polarizing orientation is selectively photo-isomerized into a cis-state. Molecules which have been relaxed to take a trans2-state having an absorption axis orthogonal to the polarizing orientation, no longer absorb radiation, and are fixed in the state. Consequently, from a macroscopic viewpoint, the anisotropy of the absorption coefficient and refractive index, that is, dichroism and double refraction, are induced. In general, these characteristics are referred to as photo-induced double refraction, photo-induced dichroism or photo-induced anisotropy. By applying circular-polarizing or non-polarizing radiation, the excited anisotropy can be erased.

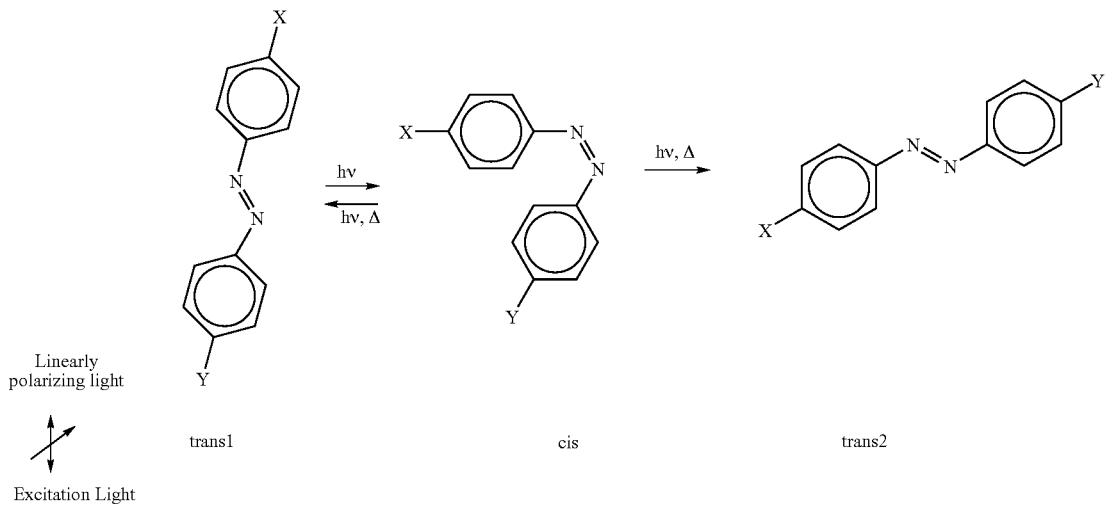

The orientation of such a polymer having a photo-isomerizable group is also changed by the photo-isomerization to induce greater double refraction. The double refraction thus induced is stable at a temperature lower than the glass transition temperature of the polymer, and preferably used for hologram recording.

Preferable examples of the materials constituting the recording layer 14 include polyester (hereinafter, referred to as "azopolymer") having azobenzene in its side chain, which is represented by the following formula (1). Azobenzene on the side chain of this polyester is photo-isomerized to give photo-induced anisotropy. The intensity and polarizing direction of signal radiation can be recorded as holograms by using the polyester due to the photo-induced anisotropy. Among polyesters of this kind, in particular, polyesters having cyanobenzene on their side chain are preferably used. ("Holographic recording and retrieval of polarized radiation by use of polyester containing cyanoazobenzene units in the side chain", K. Kawano. T. Ishii, J. Minabe, Ti. Niitsu, Y. Nishikata and K. Baba, Opt. Lett. Vol. 24 (1999) pp. 1269–1271).

an integer of 2 to 18, more preferably, 4 to 10, and n is an integer of 5 to 500, more preferably, 10 to 100.

The film thickness of each recording layer 14 is preferably in a range of 1 to 100 μm, more preferably, 5 to 30 μm. Moreover, the total of the film thicknesses of the recording layers 14 in the entire medium is preferably in the range of 10 to 1000 μm, more preferably, 100 to 500 μm. The method for providing the above-mentioned recording layer 14 will be described later.

In order to increase the total of the film thicknesses of the recording layers in the entire medium and impart a function of recording volume holograms to the recording medium by laminating recording layers 14, intermediate layers 16 are inserted between the recording layers 14. With respect to the material to be used for forming the intermediate layer 16, examples thereof include water-soluble materials such as polyvinyl alcohol (PVA), polyethylene glycol, cationized cellulose, sodium carboxymethylcellulose, water-soluble chitosan, gelatin, amylose and pectinic acid. Moreover, as described above, a hologram recording material is added to General formula (1)

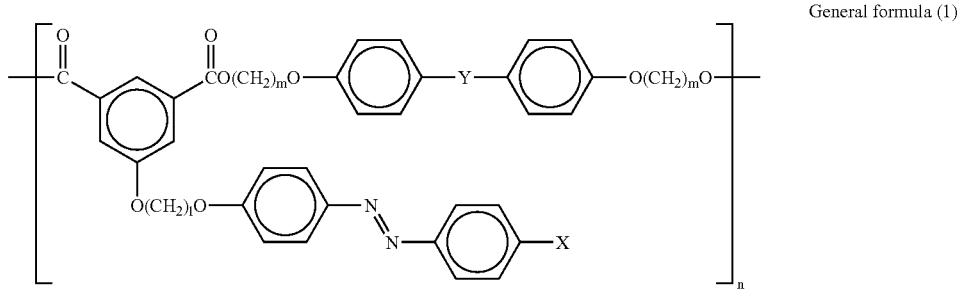

In the general formula (1), X represents a cyano group, a methyl group, a methoxy group or a nitro group, and Y represents a divalent connecting group that forms an ether bond, a ketone bond or a sulfone bond. Each of l and m is the intermediate layers 16 as well as recording layers 14. Since the hologram recording material is contained in the intermediate layer 16, the medium as a whole is utilized as a recording layer.

The thickness of the intermediate layer 16 is preferably made thinner than that of the recording layer 14. More specifically, the thickness of the intermediate layer 16 is preferably from 0.05 to 0.2 μm, more preferably, from ¼ or less of the incident wavelength λ. By making the intermediate layer 16 thinner, the recording layer 14 is virtually made thicker. By making the intermediate layer 16 thinner to ¼ or less of the incident wavelength λ, the reflection on the interface is prevented. The method for providing the above-mentioned intermediate layer 16 will be described layer.

[Method for Producing an Optical Recording Medium]

The following description will discuss the method for producing an optical recording medium by which the above-mentioned optical recording medium is produced. In the production method of the invention, the following "forming process of a recording layer" and "forming process of an intermediate layer" are repeated alternately to produce an optical recording medium in which recording layers and intermediate layers are alternately laminated.

(Forming Process of Recording Layers)

The recording layer 14 is provided by spin-coating a coating solution for the recording layer on the surface of a transparent substrate 12 or an intermediate layer 16. The spin-coating process is carried out by dropping the coating solution on a portion near center on a rotating disc-shaped transparent substrate 1; the coating solution is driven toward the periphery of the transparent substrate 12 by centrifugal force to form a film; an excessive coating solution is flied out from the periphery of the transparent substrate 12; and the solvent is removed from the film.

The coating solution for the recording layer is prepared by dissolving the above-mentioned hologram recording material in an appropriate solvent. With respect to the solvent used for preparing the coating solution, examples thereof include: tetrahydrofran (THF), chloroform, methylene chloride and the like. These may be used alone, or two or more of these may be used in combination. The solvent is appropriately selected by considering the solubility of the material used in the recording layers 14 and the solubility of the material constituting the intermediate layers 16, in order to completely dissolve the material to be used in the recording layer 14 and also to prevent the intermediate layer 16 from being dissolved during coating.

The concentration of the coating solution for the recording layer is preferably from 0.01 to 50% by mass, more preferably, from 0.5 to 10% by mass, in order to form a uniform and thick film. The hologram recording material and the like are evenly dissolved in the solvent by using a method such as an ultrasonic treatment, a homogenizer treatment, and a heating treatment. Here, various additives, such as an antioxidant, a UV absorbing agent, a plasticizer and a lubricant may be further added to the coating solution, depending on its objects.

The amount of the coating solution to be coated is preferably from 100 to 5000 ml/m$^2$, more preferably, from 200 to 1000 ml/m$^2$. The revolutions rate of the substrate in a period from the addition of the coating solution to the completion of the drying process is preferably from 10 to 50000 rpm, more preferably, from 100 to 10000 rpm. The coating temperature is preferably from room temperature to 130° C., more preferably, from 20 to 100° C. Moreover, the relative humidity at the time of coating is preferably from 5 to 80% RH, more preferably, from 5 to 70% RH. Moreover, a drying process may be further added thereto.

(Forming Process of Intermediate Layers)

The intermediate layer 16 is provided by spin-coating a coating solution for the intermediate layer on the surface of the recording layer 14. The coating solution for the intermediate layer is prepared by dissolving the above-mentioned materials that will constitute the intermediate layer in an appropriate solvent. With respect to the solvent used for preparing the coating solution, a solvent that does not dissolve the materials constituting the recording layer 14 is required. An example of such a solvent is water.

The concentration of the coating solution for the intermediate layer is preferably from 0.01 to 50% by mass, more preferably, from 0.1 to 10% by mass.

The amount of the coating solution to be coated is preferably from 100 to 5000 ml/m$^2$, more preferably, from 200 to 1000 ml/m$^2$. The revolution rate of the substrate in a period from the addition of the coating solution to the completion of the drying process is preferably from 10 to 50000 rpm, more preferably, from 100 to 10000 rpm. The coating temperature is preferably from room temperature to 130° C., more preferably, from 20 to 100° C. Moreover, the relative humidity at the time of coating is preferably from 5 to 80% RH, more preferably, from 5 to 70% RH. Moreover, a drying process may be further added thereto.

As described above, the coating solution that does not dissolve the recording layer is spin-coated on a surface of the recording layer formed by the spin-coating, to form an intermediate layer. And a recording layer can be further laminated on the surface of the intermediate layer thus formed; therefore, it becomes possible to make the laminated film thicker by using the intermediate layers.

In the resulting optical recording medium, the intermediate layer also contains a hologram recording material that can be isomerized to record holograms upon application of radiation having the same wavelength as radiation used for isomerizing the hologram recording material contained in the recording layer; thus, the holograms are recorded in the recording layers and the intermediate layer sandwiched between the recording layers. Here, in order to record volume-type holograms, a total thickness of the film constituted by the recording layers and the intermediate layers is preferably at least 10 μm.

According to the method for producing the optical recording medium of the invention, the coating solution that does not dissolve the recording layer is spin-coated on the surface of the recording layer, to form the intermediate layer. And a recording layer can be further laminated on the surface of the intermediate layer thus formed; therefore, the resulting effect is that the recording layer is made thicker by using the intermediate layers.

Moreover, according to the optical recording medium of the invention and the producing method thereof, the intermediate layer contains a photo-isomerizable component that can be isomerized upon application of radiation having the same wavelength as radiation used for isomerizing the photo-isomerizable component contained in the recording layer. Therefore, it is possible to form volume-type holograms over the entire thick film in which the layers are laminated.

What is claimed is:

1. An optical recording medium comprising a plurality of recording layers on which information is recorded holographically on a disc-shaped substrate, wherein
   the recording layers each contain photo-isomerizable components that record holograms through photo-isomerization, and
   intermediate layers, each of which contains photo-isomerizable components that are isomerized by radiation having a same wavelength as radiation used for isomerizing the photo-isomerizable component contained in the recording layer and is composed of a material that is one of dissolved or dispersed in a solvent that does not dissolve the recording layer, are laminated alternately in the optical recording medium.

2. An optical recording medium according to claim 1, wherein the recording layer is composed of a water-insoluble material and the intermediate layer is composed of a material that cannot be dissolved in water.

3. An optical recording medium according to claim 1, wherein the recording layers contain photo-isomerizable components that can be isomerized by radiation having the same wavelength.

4. An optical recording medium according to claim 1, wherein a thickness of the intermediate layer is thinner than the thickness of the recording layer.

5. An optical recording medium according to claim 1, wherein a thickness of the intermediate layer is no more than ¼ of an incident wavelength $\lambda$.

6. An optical recording medium according to claim 1, wherein the photo-isomerizable component is a polymer component containing a photo-isomerizable organic atomic group or a polymer component in which photo-isomerizable organic molecules are dispersed.

7. An optical recording medium according to claim 6, wherein the photo-isomerizable organic atomic group or the photo-isomerizable organic molecules are azobenzene.

8. An optical recording medium according to claim 1, wherein a laminated film constituted by the recording layers and the intermediate layers has a thickness of at least 10 μm.

* * * * *